UNITED STATES PATENT OFFICE.

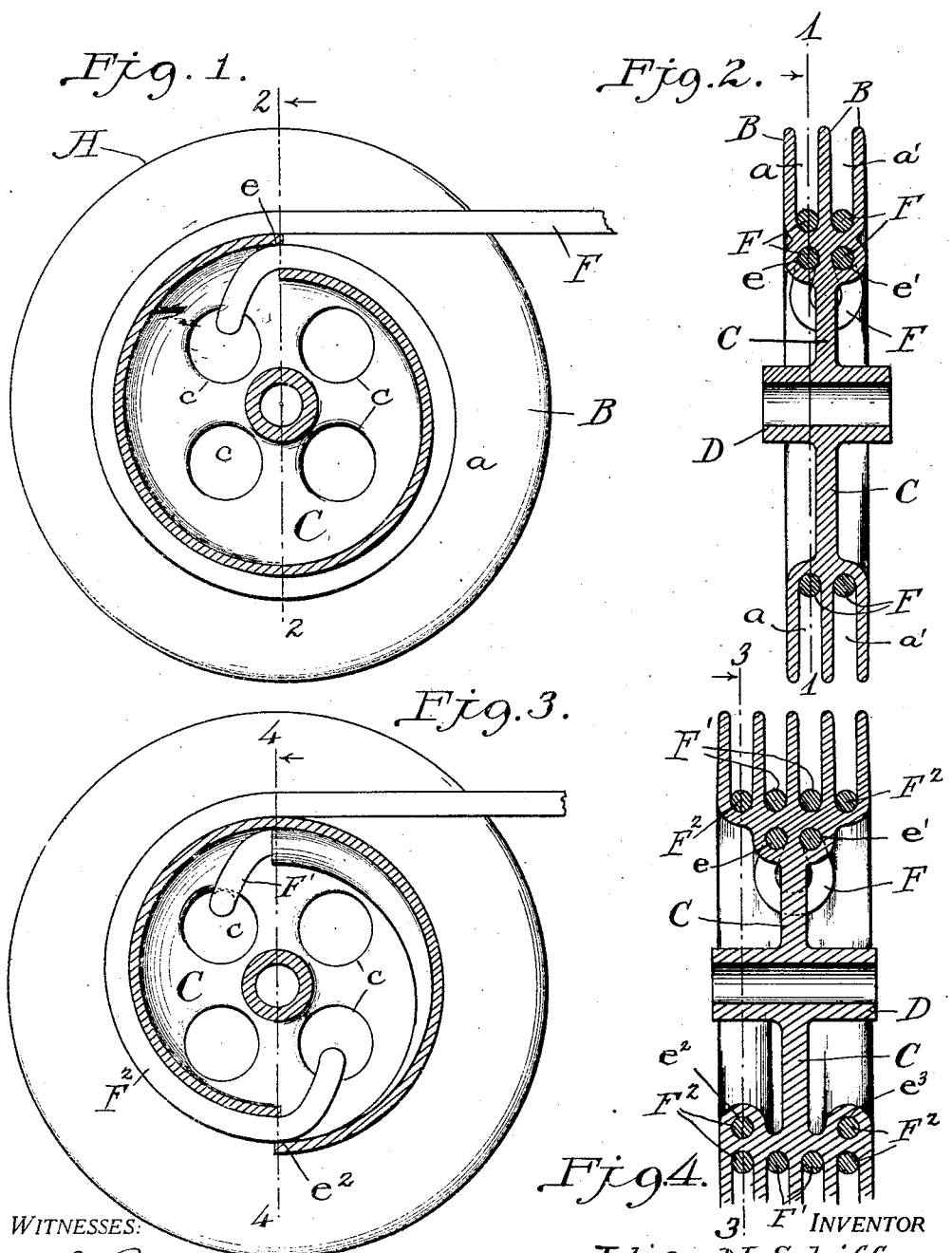

JULIAN N. SCHIFF, OF NEW YORK, N. Y.

MULTIPLEX-SHEAVE DRUM.

1,340,297.  Specification of Letters Patent. Patented May 18, 1920.

Application filed June 14, 1918. Serial No. 239,979.

*To all whom it may concern:*

Be it known that I, JULIAN N. SCHIFF, a citizen of the United States, residing in the city of New York, borough of Manhattan, county and State of New York, have invented a certain new and useful Multiplex-Sheave Drum, of which the following is a specification.

This invention is a multiplex sheave drum embodying a plurality of grooves whereby a plurality of cables may be coiled or uncoiled simultaneously so that the successive convolutions of each of the cables, respectively, are in substantially the same plane, and the resulting layers of cables are in parallel planes. By this manner of operating the cables they are wound in clock spring fashion, and not helically as is commonly the case. A further feature of the invention embodies means for securing the cable or cables to the sheave drum in a simple and practical manner. This feature of the invention, in a more specific aspect, consists in providing the base of each groove with an aperture, inserting a cable through one of these apertures, carrying it along the interior of the sheave drum, and leading it out of the corresponding aperture of another groove, thereby dispensing with fastening devices.

The flanges of the sheave drum are comparatively deep, whereby a plurality of layers of cables may be successively wound without danger of slipping over said flanges and winding on the shaft, or interfering with the operation of adjacent cables. Moreover, the flanges of the construction specified force the cables, whether slack or otherwise, to wind accurately and without danger of displacement.

Features of the invention other than those specified will be apparent from the following specification read in conjunction with the accompanying drawings.

In the accompanying drawings we have illustrated different practical embodiments of the invention, but the constructions shown therein are to be understood as illustrative, only, and not as defining the limits of the invention.

Figure 1 is a planetary section through a sheave drum of the present invention, said section being taken on line 1—1, Fig. 2, and illustrating the manner in which the cables are secured to the drum;

Fig. 2 is a diametric section taken on line 2—2, Fig. 1;

Fig. 3 is a planetary section through a modified form of the invention wherein four cables adapted to be operated on a single drum, and illustrating the manner of securing these cables to said drum without attaching means. This section is taken on line 3—3, Fig. 4; and Fig. 4 is a diametric section on line 4—4, Fig. 3.

Referring to the drawings, and particularly the Figs. 1 and 2 thereof, A designates the sheave drum of the present invention. This sheave drum is preferably cast, being provided on its circumference with a plurality of grooves $a$ $a'$ formed between the flanges B. The drum is provided with the usual web C formed integral with which is the hub D, said web being cut away as at C, as is common for lessening the weight of the drum.

The salient feature of the present invention resides in the fact that the cables which the drum operates are adapted to be secured to the drum without any fastening means whatever, and to this end the base of each groove $a$ $a'$ is provided with apertures $e$ $e'$ respectively through which cables may be passed, and the base of each of said grooves is formed after the manner of a spiral so that when the cable is wound about the drum it may be readily lead through the apertures $e$ $e'$ as is clearly shown in Fig. 1.

When it is desired to attach a cable to a drum of the type specified, one end of the cable is passed through aperture $e$ at the base of the groove $a$, into the interior of the drum whence it is passed through one of the cut-away portions $c$ in the web thereof, thence through the aperture $e'$ at the base of the groove $a$. If the cables, which it is desired to operate in the respective grooves $a$ $a'$, are to be of the same length, the cable is shifted along until both of its ends are of equal length, whereupon said cable will have an assumed position as illustrated at F in Figs. 1 and 2. It will be manifest from the foregoing that when the cables are in the position described, they are adapted to be wound or unwound simultaneously either in the same or opposite directions as desired, and that all fastening means is obviated since the cables are precluded from shifting on the drum by engagement with the rigid web thereof. Attaching means may be used, if desired.

In Figs. 3 and 4 of the drawings I have shown a sheave drum embodying four grooves for allowing the simultaneous operation of a like number of cables. These cables are attached to the drum in substantially the same manner as that heretofore described, the cables being secured in pairs. In other words, the two inside cables F′ F′ are continuations of the same cable, whereas the two outside cables F² F² are similarly formed by looping a single cable. All four of these cables are secured to the drum by engagement with the web thereof, and substantially the only difference between the form of the invention shown in Figs. 1 and 2 and that illustrated in Figs. 3 and 4 is that in the latter embodiment the apertures $e^2$ $e^3$ are positioned diametrically opposite from the apertures $e$ $e'$. This is optional, however, since, manifestly, they might be all on the same side of the drum.

A sheave drum made according to the present invention may embody two or more grooves, i. e., it is a multiplex arrangement, preferably embodying grooves in even numbers. The mere matter of numbers is, however, not essential, since the principle involved is the same in any case, viz., cables are secured to the drums without attaching means and are adapted to be wound in their respective grooves in clock spring fashion.

While the sheave has been particularly described in conjunction with cables, it will be understood that, with slight obvious modifications, in the shaping of the grooves, it is equally applicable for use with chains.

Having thus fully described the invention, what I claim as new and desire to secure by Letters Patent is:—

1. A multiple sheave drum provided on its periphery with a plurality of convolute grooves, one end of each of which communicates with the interior of the drum and a hub within the drum and spaced from the drum by an apertured web, whereby a cable may be secured to the drum by passing it through one convolute groove into the interior of the drum, thence through the apertured web, and out through another convolute groove.

2. A multiple sheave drum provided on its periphery with a plurality of convolute grooves, one end of each of which communicates with the interior of the drum, whereby a cable may be secured to the drum by passing it along one of said grooves into the interior of the drum and thence to, and out through, another of said grooves.

In testimony whereof I have signed my name to this specification.

JULIAN N. SCHIFF.